United States Patent
Howard et al.

(10) Patent No.: US 9,322,221 B2
(45) Date of Patent: *Apr. 26, 2016

(54) RISER FLOATATION WITH ANTI-VIBRATION STRAKES

(71) Applicant: Diamond Offshore Drilling, Inc., Houston, TX (US)

(72) Inventors: Donald Paul Howard, Houston, TX (US); Alan Hugh Summers, Houston, TX (US); Harris A. Reynolds, Jr., Houston, TX (US); Kati Rachelle Andrus, Houston, TX (US)

(73) Assignee: Diamond Offshore Drilling, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,367

(22) Filed: Dec. 7, 2012

(65) Prior Publication Data

US 2013/0095712 A1    Apr. 18, 2013

Related U.S. Application Data

(63) Continuation of application No. 12/793,183, filed on Jun. 3, 2010, now Pat. No. 8,443,896.

(60) Provisional application No. 61/184,225, filed on Jun. 4, 2009.

(51) Int. Cl.
| | |
|---|---|
| E21B 7/12 | (2006.01) |
| E21B 17/01 | (2006.01) |
| F16F 15/00 | (2006.01) |
| B63B 21/66 | (2006.01) |
| B63B 39/00 | (2006.01) |

(52) U.S. Cl.
CPC ............ *E21B 17/012* (2013.01); *F16F 15/00* (2013.01); *B63B 21/663* (2013.01); *B63B 39/005* (2013.01)

(58) Field of Classification Search
USPC ......... 166/345, 350–352, 360, 367, 378–380; 405/171; 441/133; 7/345, 350–352, 7/360, 367, 378–380
See application file for complete search history.

(56) References Cited

U.S. PATENT DOCUMENTS

| | | |
|---|---|---|
| 3,957,112 A | 5/1976 | Knibbe et al. |
| 4,057,450 A | 11/1977 | Lee |

(Continued)

FOREIGN PATENT DOCUMENTS

| | | |
|---|---|---|
| WO | 2002/095278 A1 | 11/2002 |
| WO | 2008/035114 A1 | 3/2008 |

(Continued)

OTHER PUBLICATIONS

Reduction/Suppression of VIV of Circular Cylinders Through Roughness Distribution at 8 × 103 < Re < 1.5 × 105. Proceedings of the ASME 27th International Conference on Offshore Mechanics and Arctic Engineering OMAE 2008. Jun. 15-20, 2008, Estoril, Portugal. Michael M.Bernitsas, Ph.D.. 5 pages.

(Continued)

*Primary Examiner* — Matthew Buck
*Assistant Examiner* — Aaron Lembo
(74) *Attorney, Agent, or Firm* — Osha Liang LLP

(57) ABSTRACT

A substantially cylindrical buoyancy module for a marine riser includes a plurality of buoyancy elements separated along at least one helical separation plane.

26 Claims, 10 Drawing Sheets

(56) References Cited

U.S. PATENT DOCUMENTS

| | | | |
|---|---|---|---|
| 4,422,801 A * | 12/1983 | Hale et al. ............... | 405/171 |
| 4,474,129 A | 10/1984 | Watkins et al. | |
| 4,477,207 A | 10/1984 | Johnson | |
| 5,214,244 A * | 5/1993 | Cummings et al. ............ | 174/42 |
| 5,421,413 A | 6/1995 | Allen et al. | |
| 5,738,034 A | 4/1998 | Wolff et al. | |
| 6,004,074 A | 12/1999 | Shanks, II | |
| 6,010,278 A | 1/2000 | Denison et al. | |
| 6,048,136 A | 4/2000 | Denison et al. | |
| 6,179,524 B1 | 1/2001 | Allen et al. | |
| 6,223,672 B1 | 5/2001 | Allen et al. | |
| 6,257,337 B1 | 7/2001 | Wells | |
| 6,347,911 B1 | 2/2002 | Blair et al. | |
| 6,439,810 B1 | 8/2002 | Nish et al. | |
| 6,632,112 B2 | 10/2003 | Nish et al. | |
| 6,644,894 B2 | 11/2003 | Shu et al. | |
| 6,695,540 B1 | 2/2004 | Taquino | |
| 6,712,559 B2 * | 3/2004 | Lenormand et al. ....... | 405/224.2 |
| 6,758,710 B2 | 7/2004 | Brown et al. | |
| 6,817,309 B2 * | 11/2004 | Horton ................... | 114/264 |
| 6,854,516 B2 | 2/2005 | Nish et al. | |
| 6,896,062 B2 | 5/2005 | Davies et al. | |
| 6,948,884 B2 * | 9/2005 | Xu et al. ................. | 405/216 |
| 7,070,361 B2 | 7/2006 | McMillan et al. | |
| 7,214,114 B2 * | 5/2007 | Gibson .................. | 441/133 |
| 7,383,885 B2 | 6/2008 | Bergeron et al. | |
| 7,398,697 B2 * | 7/2008 | Allen et al. .............. | 73/800 |
| 7,406,923 B2 * | 8/2008 | Allen et al. .............. | 114/243 |
| 7,451,822 B2 | 11/2008 | Deul | |
| 7,467,913 B1 * | 12/2008 | Allen et al. .............. | 405/224 |
| 7,628,665 B1 * | 12/2009 | Cook et al. .............. | 441/133 |
| 2001/0036387 A1 | 11/2001 | Richter et al. | |
| 2002/0146287 A1 | 10/2002 | Allen et al. | |
| 2002/0189812 A1 | 12/2002 | Cordy et al. | |
| 2003/0026663 A1 | 2/2003 | Guesnon et al. | |
| 2003/0143035 A1 * | 7/2003 | Karayaka et al. ........ | 405/224.2 |
| 2006/0280559 A1 * | 12/2006 | Allen et al. ............... | 405/216 |
| 2007/0196181 A1 * | 8/2007 | Tyrer et al. .............. | 405/224.2 |
| 2008/0017385 A1 * | 1/2008 | Gibson .................. | 166/350 |
| 2008/0286049 A1 | 11/2008 | Eide | |
| 2008/0289829 A1 | 11/2008 | Bergeron et al. | |
| 2008/0302537 A1 | 12/2008 | McMiles | |
| 2011/0280667 A1 * | 11/2011 | Branchut et al. ......... | 405/224.2 |

FOREIGN PATENT DOCUMENTS

| | | |
|---|---|---|
| WO | 2008087372 A1 | 7/2008 |
| WO | 2009/035481 A1 | 3/2009 |

OTHER PUBLICATIONS

Henning Devices: A New Class of VIV Suppression Apparatus for Offshore Tubulars. Offshore Drilling Conference 19881. Don W. Allen. 4 pages.

Trelleborg Product information pamphlet. Drilling Products: Engineering Systems. 16 pages.

Drilling riser fairings designed to maximize drilling uptime. Shell Global Solutions. 14 pages.

International Search Report issued in corresponding International Application No. PCT/US2010/037438; Dated Jan. 21, 2011 (3 pages).

Written Opinion of the International Searching Authority issued in corresponding International Application No. PCT/US2010/037438; Dated Jan. 21, 2011 (3 pages).

* cited by examiner

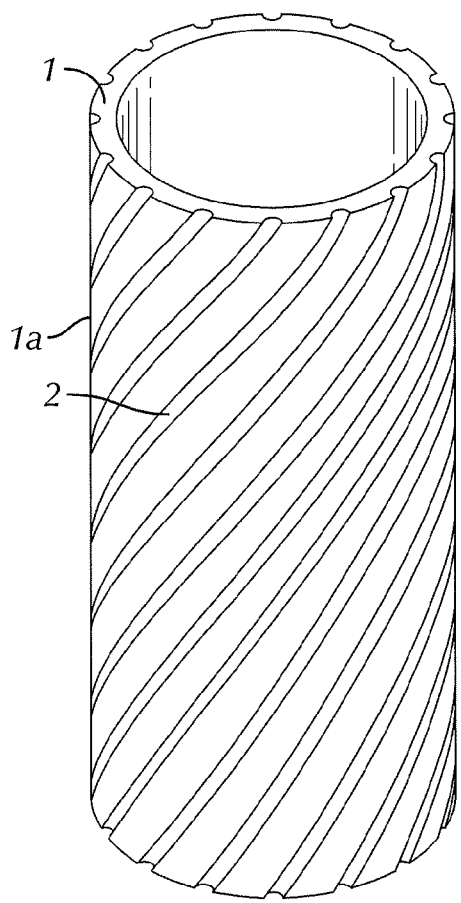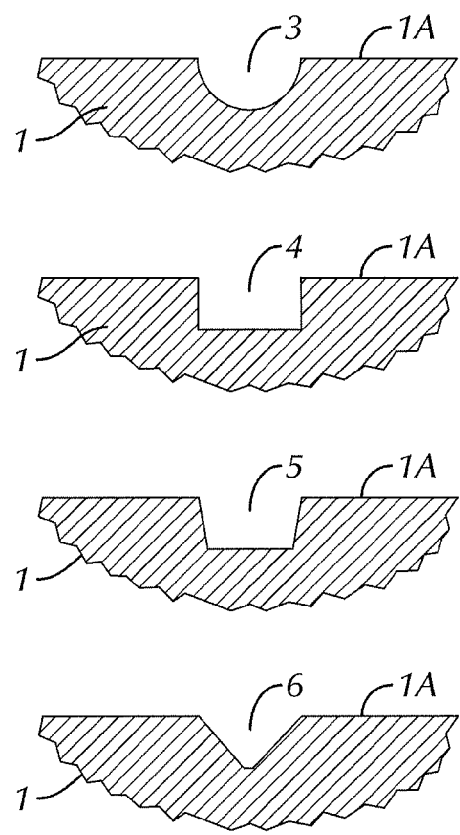
FIG. 1A
(Prior Art)
FIG. 1B
(Prior Art)

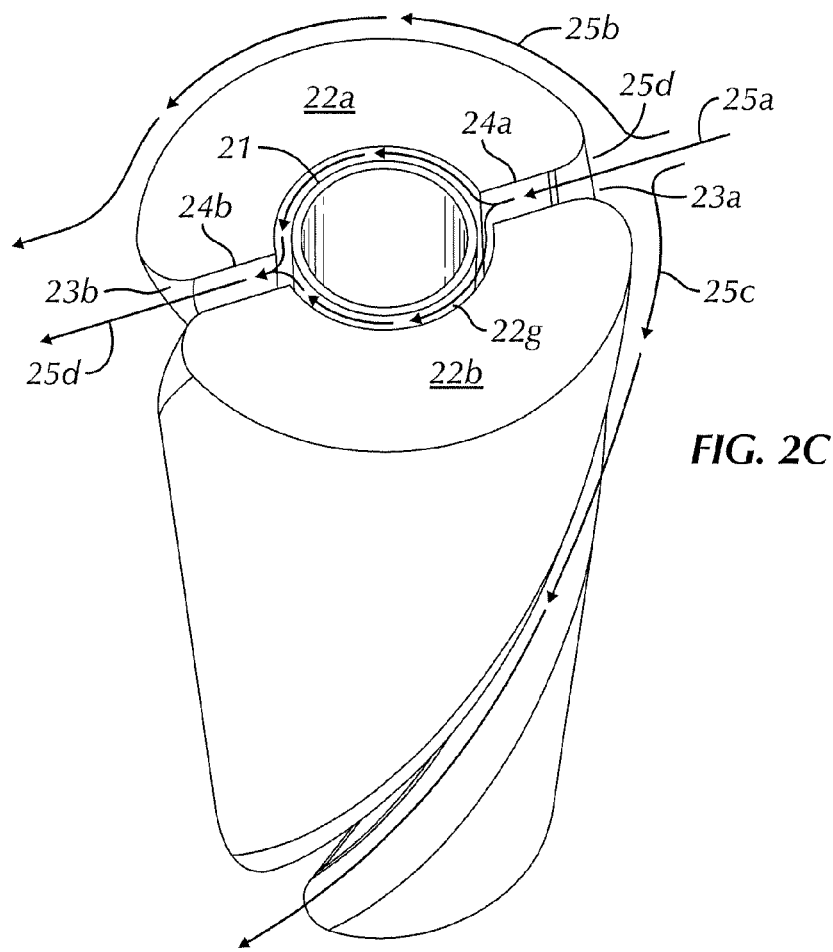
*FIG. 2C*
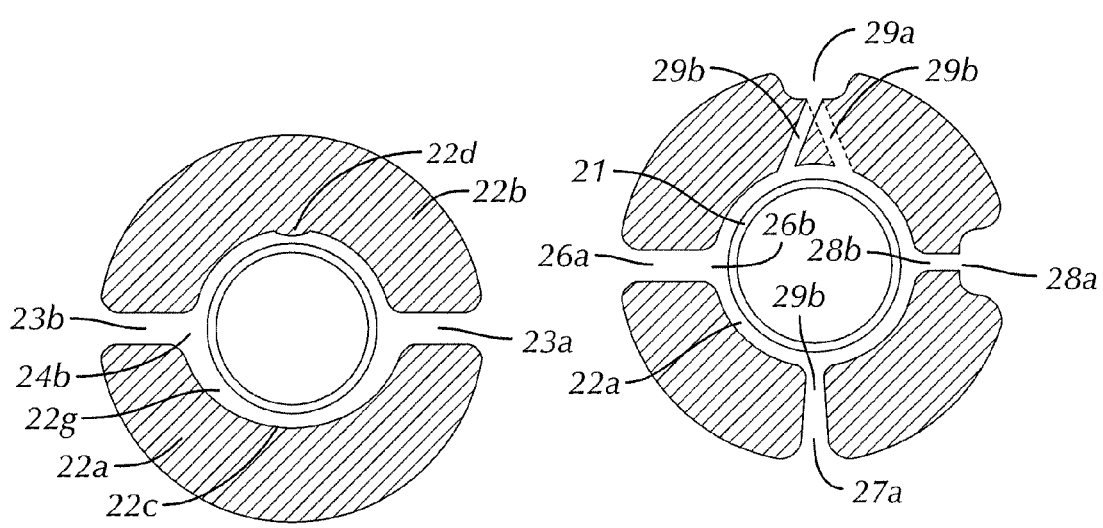
*FIG. 2D*  *FIG. 2E*

RISER FLOATATION WITH ANTI-VIBRATION STRAKES

CROSS-REFERENCE TO RELATED APPLICATIONS

This application claims priority of a provisional application under 35 U.S.C. §119(e), namely U.S. Patent Application Ser. No. 61/184,225 filed Jun. 4, 2009, which is incorporated by reference in its entirety herein.

BACKGROUND

1. Field of the Disclosure

Embodiments disclosed herein relate generally to marine riser buoyancy modules. In particular, embodiments disclosed herein relate to marine riser buoyancy modules configured to reduce vortex-induced vibration.

2. Background Art

Offshore oil and natural gas drilling and production, particularly in deep water, relies on substantially vertical conduits called "marine risers" to convey fluids and slurries between the seabed and the surface, including but not limited-to, drilling risers, production risers, export risers, steel catenary risers ("SCRs"), and flexible composite flowlines.

Some marine risers, such as SCRs, may include a single conduit, while other risers, such as drilling risers, may include a larger-diameter main conduit with a plurality of attached, smaller diameter auxiliary lines, including but not limited-to, choke and kill lines, "boost" lines, and hydraulic supply and control lines. In some cases, electrical or fiber optic control umbilicals may also be attached to the main conduit of the marine riser.

Typically a marine riser may be at least partially supported by floatation of one form or another, including for example evacuated buoyancy "cans" or buoyancy modules made from, for example, syntactic foam material. Buoyancy modules may be arranged circumferentially around the main conduit of a marine riser. Marine drilling risers, for example, typically have syntactic foam buoyancy modules, each including two "clamshell" longitudinal half-cylinder buoyancy elements that are clamped around the main conduit, and which have molded-in grooves, recesses and holes to accommodate attachment hardware and auxiliary lines.

Other types of marine risers may have evacuated buoyancy "cans" which may be generally toroidal (i.e., doughnut-shaped) and slipped over the main conduit, or may have evacuated buoyancy "cans" of other forms (e.g., closed-end cylinders) arranged in a circumferential array around the main riser conduit. Sometimes, buoyancy cans may be connected to the surface by piping so that water may be evacuated from the cans by high-pressure gas (such as compressed air or nitrogen) or by a buoyant slurry comprising, for example, glass microspheres.

If marine risers are installed in an area having significant currents, especially, for example, in or near the Loop Current in the Gulf of Mexico, or near the mouth of the Amazon River in Brazil, the current may induce a significant lateral drag force (usually simplified to "drag") on the marine riser, and in some cases may also induce the marine riser to vibrate or "strum," typically in a plane perpendicular to the current direction, in what is called Vortex-Induced Vibration, or "VIV." In some cases, VIV may be reduced by changing the natural frequency of the riser string, as by increasing the tension on the string, but this has the side-effect of further loading the marine structure from which the marine riser is suspended (e.g., a drilling vessel such as a drillship or semisubmersible, or a tension-leg platform, or a floating production vessel).

Drag on the riser string may increase the bending loads on the riser joints and attached equipment, increase the load on riser tensioning equipment, and increase loads on mooring equipment and/or increase energy costs for dynamic positioning. In some cases, drag may make it difficult or impossible to run or retrieve a riser, especially if the weather is unsettled. Additionally, VIV may reduce the fatigue life of a riser string.

Furthermore, in deep water, marine risers may require even larger-diameter buoyancy modules, which tend to increase drag and increase the tendency for VIV. For example, drilling risers of the prior art used in water depths up to about 8,000 feet generally use syntactic foam buoyancy modules which are about 48½ inches in diameter, while drilling risers of the prior art used in depths greater than 8,000 feet may use syntactic foam buoyancy modules which are about 54 to 55 inches in diameter.

Substantial effort has been expended in the prior art on means of reducing drag and/or suppressing VIV in marine risers, including but not limited-to temporarily-installed devices such as helical strakes, flags, wake splitters, and rotating generally foil-shaped fairings. In addition, permanent alterations to the surface of the marine riser buoyancy modules have been proposed, including grooves and dimples, and alterations to the surface roughness of the floatation. Further, on larger-scale bluff bodies such as SPAR structures, integral fluid passages with control valves have been proposed to suppress VIV.

For example, riser fairings of the prior art include the following. U.S. Pat. No. 4,474,129, issued to Watkins, teaches a rotatable riser pipe fairing of syntactic foam. U.S. Pat. No. 5,421,413, issued to Allen, teaches a flexible fairing, or "shroud," surrounding a riser to reduce VIV. These shrouds may generally be denser than water, so that they would preferably be connected to the riser at the top of the shroud. U.S. Pat. No. 5,738,034, issued to Wolff, teaches streamlined fairing sections that can be installed on a drilling riser to reduce VIV. U.S. Pat. No. 6,179,524, issued to Allen, teaches a staggered fairing system for suppressing VIV of a substantially cylindrical maritime element. U.S. Pat. No. 6,223,672, issued to Allen, teaches an ultra-short fairing for suppressing VIV in substantially cylindrical marine elements. U.S. Pat. No. 7,070,361, issued to McMillen, teaches a VIV suppression fairing.

Further, International Patent Application PCT/US2008/006648, by Bernitsas, teaches adding roughness to the surface of a bluff body to modify the flow around the body and suppress VIV. Surface roughness may be defined as an "excrescence" whose thickness is no more than about 5% of the diameter of the bluff body. U.S. patent application Ser. No. 12/156,960, by McMiles, teaches a plurality of dimples, indentations or protrusions about the circumference of a bluff body to reduce drag and suppress VIV.

Still further, International Patent Application PCT/GB02/02318, by Gibson, (the '318 application) teaches a plurality of axial or helical grooves in pipe cladding, between 1 cm and 30 cm deep, to cause disruption of flow to reduce VIV. FIG. 1A shows pipe cladding according to one embodiment taught in the '318 application, wherein pipe cladding 1 has outer surface 1A, and a plurality of helical grooves 2. FIG. 1B shows "fragmentary" cross-sectional views of four different groove profiles according to the teachings of the '318 application, including "part-circular" groove 3, "oblong" groove 4, "tapered flat-bottom" groove 5, and "V-shaped" groove 6. Note that the grooves taught in FIG. 1B have substantially unradiused outer edges, and that the edges of the grooves are greater than, or substantially equal to, 90 degrees to outer surface 1A of the pipe cladding.

Strakes are disclosed in the prior art including U.S. Pat. No. 6,347,911, issued to Blair, which teaches wrap panels comprising radial rib strakes. U.S. Pat. No. 6,644,894, issued to Shu, ("the '894 patent") teaches the use of fluid passageways to reduce and/or control VIV and drag in SPARs. These and other means in the prior art of suppressing VIV in marine risers suffer from one or more serious limitations.

First, foil-shaped riser fairings, which are generally considered the most effective prior art means of suppressing VIV, are very expensive, typically costing on the order of $1 million dollars per deep-water riser string. Further, riser fairings typically must be affixed to, and removed from, the riser as it is run and retrieved; this can add significantly to the running time of the riser, and may be dangerous, as these operations typically take place on a platform suspended over open water in the moonpool of a drilling vessel. Second, other prior art means of suppressing VIV such as helical strakes or flags, are not as effective as riser fairings, but may add significantly to the current drag on the riser. Third, solutions which are integral to the riser buoyancy, such as surface treatments, have not been shown to significantly reduce drag or effectively suppress VIV as effectively as other solutions such as riser fairings. Finally, prior art means of discrete fluid diversion (as through pipes) to suppress VIV in large diameter bluff bodies like SPARs, such as the '894 patent, have not been shown to be an effective or efficient method to suppress VIV in relatively small diameter bluff bodies such as marine risers.

Further, many marine riser buoyancy modules of the prior art, including the common clamshell-style syntactic foam buoyancy modules, are unwieldy and generally difficult to install, remove and repair. For example, syntactic foam buoyancy elements (that is, each clamshell half of the common buoyancy module) are typically about 14 feet long and weigh between 1200 and 2000 pounds each in air, depending on their intended installation depth.

Accordingly, there exists a need for buoyancy modules for marine risers which may intrinsically reduce current drag, suppress or eliminate VIV, be relatively efficient in buoyancy, and be easy to install, remove, and repair.

SUMMARY OF THE DISCLOSURE

In one aspect, embodiments disclosed herein relate to a substantially cylindrical buoyancy module for a marine riser including a plurality of buoyancy elements separated along at least one helical separation plane.

In other aspects, embodiments disclosed herein relate to a substantially cylindrical buoyancy module for a marine riser including a plurality of buoyancy elements separated along at least one helical separation plane, at least one helical groove in the outer surface of the buoyancy module, wherein the at least one helical groove comprises at least one radiused outer edge, an annulus between the buoyancy module and the main conduit of the marine riser, and at least one aperture between the at least one substantially helical groove and the annulus, such that there is fluid communication between the at least one substantially helical groove and the annulus.

In other aspects, embodiments disclosed herein relate to a method of manufacturing substantially polygonal marine riser buoyancy elements having an arcuate aspect, the method including providing a master mold and mold inserts such that a range of buoyancy elements may be manufactured from one master mold, and providing mold elements such that the annular space between the riser main conduit and the buoyancy element, or the groove width between buoyancy elements may be varying during manufacture.

In other aspects, embodiments disclosed herein relate to a method of manufacturing a marine riser buoyancy module, the method including providing marine buoyancy modules comprising axially-split, semi-cylindrical buoyancy elements, and affixing supplemental buoyancy elements to an outer surface of the semi-cylindrical buoyancy elements, wherein the affixed supplemental buoyancy elements form at least one substantially helical groove on a surface of a completed buoyancy module.

Other aspects and advantages of the invention will be apparent from the following description and the appended claims.

BRIEF DESCRIPTION OF DRAWINGS

FIGS. 1A-1B show pipe cladding of the prior art.
FIG. 2C shows a perspective view of current flows around and through a marine riser with a buoyancy module in accordance with embodiments of the present disclosure.
FIGS. 2D-2E show cross sections of a marine riser with a buoyancy module in accordance with embodiments of the present disclosure.

DETAILED DESCRIPTION

Embodiments of the present disclosure relate to marine riser buoyancy modules configured to reduce vortex-induced vibration. For the purposes of the current disclosure, a buoyancy element is a discrete unit of buoyancy for a marine riser which does not encompass the full circumference of the riser, and a buoyancy module is an assembly of buoyancy elements which encompasses the full circumference of the riser, and which may have squared-off distal ends, that is, distal ends described by a plane perpendicular to the longitudinal axis of the riser.

Prior art buoyancy modules for marine drilling risers, for example, comprise two "clamshell" buoyancy elements with squared-off distal ends, that is, which are described by a plane perpendicular to the longitudinal axis of the riser. A 75 foot long marine drilling riser of the prior art will commonly be fitted with five buoyancy modules, each of which is about 14 feet long. Embodiments according to the current disclosure may include both buoyancy elements and buoyancy modules comprising these buoyancy elements.

Figures 2A, 2B:
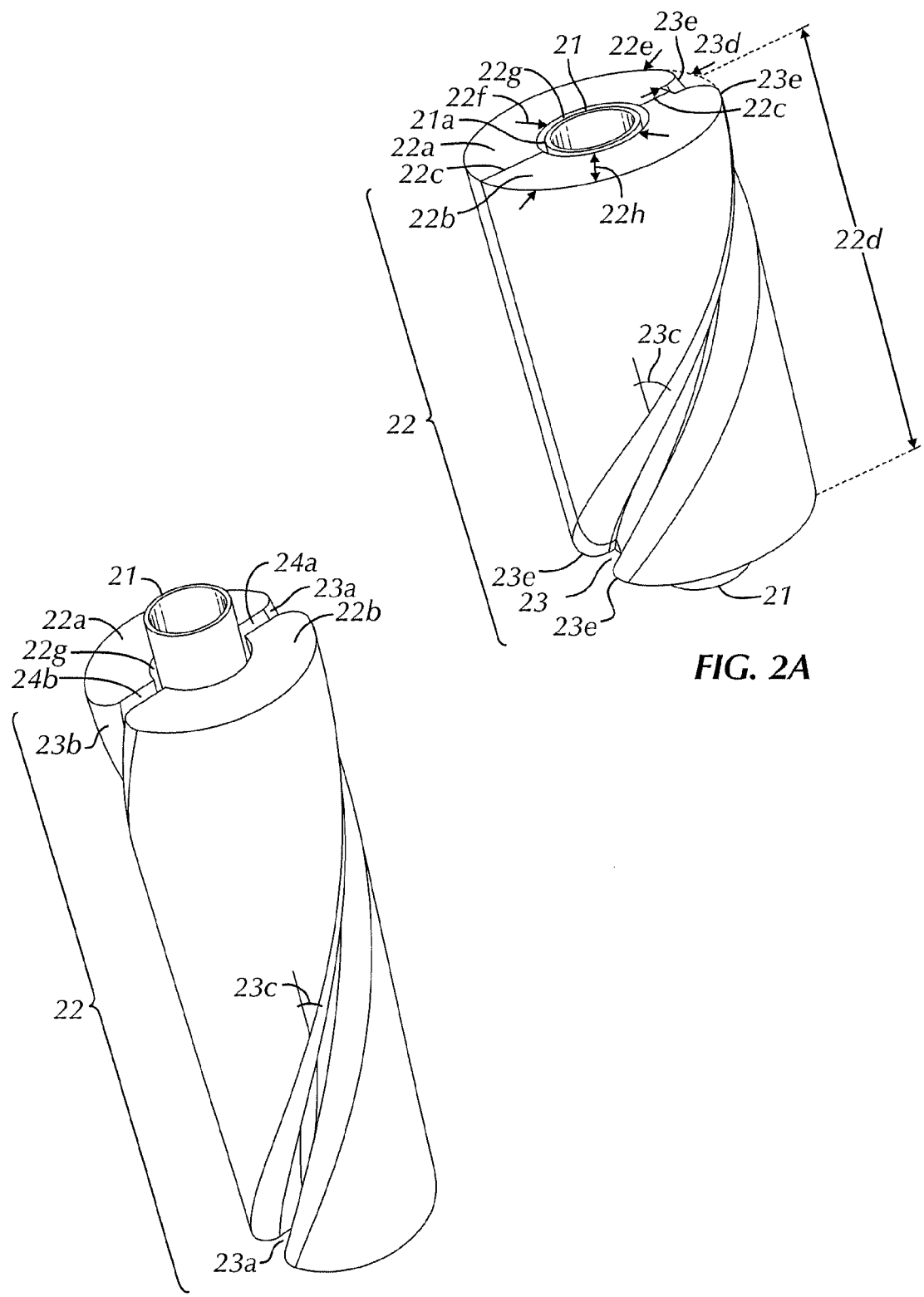
FIG. 2A shows a perspective view of a marine riser with a buoyancy module having a radiused helical groove in accordance with embodiments if the present disclosure.
FIG. 2B shows a perspective view of a marine riser with a buoyancy module having radiused helical grooves, and annulus between the riser main conduit and the buoyancy elements, and apertures between the helical grooves and the annulus, in accordance with embodiments of the present disclosure.

Referring now to FIG. 2A, a perspective view of a marine riser with a buoyancy module having a radiused helical groove is shown in accordance with embodiments if the present disclosure. In this embodiment, the marine riser is shown without auxiliary lines, as is typical of many SCRs, but those having ordinary skill in the art will recognize that this embodiment may be adapted to marine risers with auxiliary lines, such as drilling risers.

Riser main conduit 21 has outer diameter 21A. Buoyancy module 22 includes buoyancy elements 22A and 22B, which may be mated at axial separation plane 22C. Buoyancy module 22 has length 22D, outer diameter 22E, inner diameter 22F and buoyancy thickness 22H. In certain embodiments, buoyancy elements 22A and 22B may include syntactic foam. In another embodiment, buoyancy elements 22A and 22B may include buoyancy cans. In yet another embodiment, buoyancy elements 22A and 22B may include flexible buoyancy "bags" filled with buoyant material, for example, glass micro spheres and/or plastic macro spheres, attached to rigid trays secured to riser main conduit 1. Those skilled in the art will understand other variations for the buoyancy elements that may be used.

Substantially helical groove 23 has groove depth 23D, and radiused edges 23E. If buoyancy module 22 is made from syntactic foam, substantially helical groove 23 may be cut or molded into outer diameter 22E of buoyancy module 22. Alternatively, substantially helical groove 23 may be formed from a rigid material such as sheet metal, thermoset composites, or thermoplastic. If for example buoyancy elements 22A and 22B include buoyancy cans made from a sheet material, substantially helical groove 23 may be fabricated from a bent and split tube of a similar material.

Annulus 22G is the space between the inner diameter 22F of buoyancy module 2 and outer diameter 21A of main conduit 1. In the embodiment shown in FIG. 2A, in which annulus 22G is not in fluid communication with substantially helical groove 23, annulus 22G may typically be very small, on the order of less than 1 inch. In a related embodiment, annulus 22G is between 0.2 and 0.5 inches wide. In another embodiment, the annulus 22G is about zero; that is, buoyancy module 22 is generally in contact with main conduit 21. In other embodiments discussed later, in which the annulus is in fluid communication with at least one substantially helical groove, annulus 22G may be larger, i.e., on the order of 1-2 inches, to, for example, encourage pressure-equalizing flows through the annulus.

Substantially helical groove 23 has helical angle 23C with respect to a line on the surface of the buoyancy module, which is parallel to the longitudinal axis of the riser. In a related embodiment, buoyancy module 22 has a plurality of substantially helical grooves. In another related embodiment, buoyancy module 22 has a plurality of substantially helical grooves radially offset from one another by at least 90 degrees. In the embodiment shown in FIG. 2A, substantially helical groove 23 encompasses about 180 degrees, so it has a helical angle 3C of:

$$\alpha = \arctan\left(\frac{\pi DL}{2}\right)$$

Where α=helical angle; D=buoyancy outer diameter; L=buoyancy length.

For example, if buoyancy module has the standard dimensions of buoyancy modules in the prior art of 168 inches in length and 48½ inches outer diameter, then substantially helical groove 23 has a helical angle 23C of about 24.4 degrees.

The "pitch" of helical groove 23 may be defined as follows:

$$\text{Pitch} = \frac{\pi D}{\tan(\alpha)}$$

Or, in terms of "diameters:"

$$\text{Pitch} = \left(\frac{\pi}{\tan(\alpha)}\right) D$$

Where D=buoyancy outer diameter and α=helical angle.

Therefore, in the case of a buoyancy module with outer diameter of 48½ inches, and a helical angle of 24.3 degrees, the substantially helical groove has pitch of about 6.93 D. Alternately, in this case, because the axial length (168 inches) of a buoyancy module with a 180 degree helical groove (that is, half the circumference) is known, the axial length may be divided by D/2 (that is, 48.5/2=24.25) to yield a pitch of 6.93 D.

For purposes of this disclosure, helical angle may be positive or negative, according to the right-hand convention for pitch that a positive (or right-handed) helix wraps up to the right, and a negative (or left-handed) helix wraps up to the left. The helices shown in FIGS. 2A-2C, for example, have a positive helix angle and a right handed pitch, according to this convention.

In one embodiment, substantially helical groove 23 has groove depth 23B which is greater than about 5% of buoyancy module outer diameter 22E, but less than buoyancy thickness 22H. In another embodiment, helical groove 23 has groove depth 23B between about one-half and about three quarters of buoyancy thickness 22H.

In the embodiment of the current disclosure shown in FIG. 2A, buoyancy elements 22A and 22B have axial separation plane 22C. In a related embodiment, buoyancy elements 22A and 22B have a helical separation plane along substantially helical groove 23. One advantage of a helical separation plane may be that the center of buoyancy of each buoyancy element with helical separation planes may be very close to the central axis of the riser. In certain embodiments, the center of buoyancy of buoyancy elements with helical separation planes may be within 1 inch of the central axis of the riser. In other embodiments, the center of buoyancy may be within 6 inches of the central axis of the riser. In still other embodiments, the center of buoyancy may be within the outer diameter of the main conduit.

In a related embodiment, buoyancy module 22 may be molded as one piece over riser main conduit 21, with substantially helical groove 23 molded-in; that is, with no annulus 22G or separation plane 22C. In this related embodiment, the length 22D of buoyancy module 22 may be shorter (say, less than 10 feet in length) than most riser buoyancy modules of the prior art in order to better accommodate bending of the riser, and a strong adhesive bond may be established between buoyancy module 22 and main conduit 21 in order to reduce the possibility of crevice corrosion of riser main conduit 21.

In this and other embodiments, helical groove 23 may be substantially continuous between axially adjacent buoyancy modules, or may be intentionally discontinuous, that is, with a circumferential offset angle between the substantially helical grooves on adjacent buoyancy modules.

In certain embodiments of the present disclosure, a marine riser may have grooved buoyancy modules, like those shown in FIG. 2A, alternating with modules without grooves. In other embodiments, a marine drilling riser may have three buoyancy modules with grooves interspersed with two buoyancy modules without grooves. In yet another embodiment, a marine drilling riser has two buoyancy modules with grooves interspersed with three buoyancy modules without grooves.

Referring again to the embodiment of the current disclosure shown in FIG. 2A, buoyancy elements 22A and 22B may be secured to the riser main conduit by any applicable means in the prior art, such as, in one embodiment, with through-bolts between the two elements. Alternately, in another embodiment, the buoyancy elements 22A and 22B may be affixed at their axial distal ends to clamps attached to riser main conduit 21.

In another embodiment, a plurality of buoyancy modules 22 (each including buoyancy elements 22A and 22B) may be strapped to riser main conduit 21 (with, for example, stainless steel or polymer bands) beneath a riser clamp of the prior art. The number of buoyancy modules 22 which are arranged beneath a single riser clamp of the prior art may be limited only by the axial thrust load capacity of the riser clamp; this embodiment may have the advantage that it is extremely efficient, as the number of riser clamps required in a riser string may be minimized.

In another embodiment, buoyancy modules 22A and 22B may be attached to one another by "fish-plates" or similar devices across separation plane 22C. In further embodiments, a marine riser may be equipped with a plurality of buoyancy modules fitted between riser clamps, wherein the buoyancy modules are each less than 10 feet long, are made from syntactic foam, have an annulus less than ½ inch wide, and each have a plurality of substantially helical grooves. In a related embodiment, a marine riser is fitted with a plurality of grooved buoyancy modules of the current disclosure located beneath a riser clamp affixed to the riser main conduit, in which the grooved riser buoyancy modules are radiused on their axial distal ends to accommodate flexure of the riser.

When deployed in an ocean current, substantially helical groove 23 may be configured to serve as a "pressure channel" to suppress VIV, that is, part of the current striking the riser will preferentially flow along helical groove 23 instead of flowing circumferentially around the riser, thus disrupting the vortices which cause VIV, without substantially increasing the drag as may be the case with "positive" strakes of the prior art which typically protrude proud of the riser floatation. For example, the outer edges of substantially helical groove 23 may have radii 23E to reduce the formation of strake-like vortices, and to encourage the current to flow into the groove and around the circumference of the riser to an area of lower water pressure. In certain embodiments, a helical groove depth may be about 5-10% of the total buoyancy module diameter, while the groove radius may have a minimum value of about 1 inch, or equal to or greater than the groove depth. In other embodiments, for example having full length, full depth aperture as shown in FIG. 2B, a helical groove depth may equal a thickness of the buoyancy module. Still further, in certain embodiments, the edge of a substantially helical groove may have a radius of at least one inch. In another embodiment, both edges of a substantially helical groove have radii between 1 inch and five inches. In still another embodiment, both edges of a substantially helical groove have radii between 1 and 10 inches. In one embodiment of the current disclosure, radiused edges 23E have radii greater than 10% of groove depth 23D. In certain embodiments, radiused edges 23E have radii between 25% and 75% of groove depth 23D. In another embodiment, radiused edges 23E have radii about 50% of groove depth 23D.

Further, in order to optimize a substantially helical groove as a "pressure channel," the surface of buoyancy module 2 may be treated to discourage the formation of vortices at the edges of the helical groove 23, by means known in the art such as, for example, hydrophobic paint, circumferential grooves in the region of the groove, or dimpling (e.g., as on a golf ball).

For purposes of this disclosure, a hydrophobic surface may be defined as a surface that produces a seawater contact angle of at least about 70 degrees, as measured by methods understood by those skilled in the art. In computational fluid dynamics ("CFD") simulation, it has been found that treating radiused edges 23E of helical groove 23 with a smooth and hydrophobic coating may significantly reduce both hydrodynamic drag and lift. In one embodiment, at least one radiused edge 23E of at least one helical groove 23 has a hydrophobic surface. In another embodiment, the entire surface of at least one helical groove 23 is a hydrophobic surface. In selected embodiments, at least the radiused edges 23E of helical groove 23 may be coated with a hydrophobic coating such as Belzona 1341, available from Belzona Polymerics Limited of Harrogate, England.

Alternatively, substantially helical groove 23 may also be at least partly configured as a "negative strake," that is, having at least one edge designed to induce small vortices in order to suppress VIV. In one embodiment of the present disclosure, a buoyancy module for a marine riser may have at least one substantially helical groove with at least one edge that has an included angle between the outer surface of the buoyancy module and the side of the groove which is less than 90 degrees. In another related embodiment, a buoyancy module for a marine riser has at least one substantially helical groove with at least one edge having an irregular, "saw-toothed" edge.

In certain embodiments of the present disclosure, the edge of substantially helical groove 23 includes a fiber-reinforced thermoplastic edge, which is molded into the buoyancy element during manufacture. In certain embodiments, the edge of substantially helical groove 23 includes a fiber-reinforced pultruded thermoset edge. In another embodiment of the present disclosure, the edge of the groove includes a stainless steel shape. In another related embodiment of the present disclosure, a buoyancy module for a marine riser has at least one substantially helical groove 23 having one edge that is radiused and an opposing "sharp" edge with an included angle less than 90 degrees.

Referring now to FIG. 2B, a perspective view of a marine riser with a buoyancy module having radiused helical grooves, and annulus between the riser main conduit and the buoyancy elements, and apertures between the helical grooves and the annulus, is shown in accordance with embodiments of the present disclosure. Main conduit 21 is surrounded by buoyancy module 22 including buoyancy elements 22A and 22B, which are separated along helical separation planes defined by grooves 23A and 23B. In this embodiment, however, buoyancy elements 22A and 22B are not touching at all points along the helical separation plane, but are separated by apertures 24A and 24B at the inner ends of grooves 23A and 23B respectively. Consequently, groove 23A, for example, is in fluid communication with groove 23B through apertures 24A, annulus 22G, and aperture 24B.

Apertures 24A and 24B may be continuous, for example, extending the entire length of buoyancy module 22, or may include a series of slots or holes between the buoyancy elements. In one embodiment of the current disclosure, apertures 24A and 24B include a series of circular holes at the base of substantially helical grooves 23A and 23B respectively. In other embodiments, apertures 24A and 24B may include a series of slots at the base of substantially helical grooves 23A and 23B. Those having ordinary skill in the art will recognize that apertures 24A and 24B may take any number of forms, as long as they provide relatively unimpeded fluid communication between the substantially helical grooves 23A and 23B and annulus 23G.

In certain embodiments of the present disclosure, a marine riser with main conduit, but without auxiliary lines, such as a SCR, may have affixed to it at least one buoyancy module including a plurality of buoyancy elements separated by at least one helical separation plane along a plurality of substantially helical grooves. The substantially helical grooves are in fluid communication with one another through apertures at the base of the grooves and an annulus between the main riser conduit and the buoyancy elements.

FIG. 2C shows the flow of a current around a section of riser with buoyancy according to the embodiment depicted in FIG. 2B. Current 25A striking the riser may flow around it in one of three ways: first, in circumferential flow 25B, part of the current may flow substantially circumferentially around the riser, as is typical of a generally cylindrical bluff body suspended in a current. Second, in helical flow 25C, part of the current may flow around the riser in and along substantially helical grooves 23A and 23B. Third, in annular flow 25D, part of the current may flow through apertures 24A and 24B into annulus 22G, from which it may emerge at a lower-pressure area, generally on the opposite side of the riser. The helical 25C and annular flows 25D may serve to both reduce the drag on the riser and to suppress Vortex-Induced Vibration.

Because substantially helical grooves 23A and 23B are in fluid communication along substantially their entire length with annulus 22G (that is, through apertures 24A and 24B), some fraction of helical flow 25C may, somewhere along helical grooves 23A and 23B, become annular flow 25D by entering the annulus 22G through apertures 24A and 24B. Similarly, annular flow 25D may exit annulus 22G anywhere along substantially helical grooves 23A or 23B, not just at a point diametrically opposed to current 25A.

Annulus 22G is depicted in FIGS. 2A-2C as having a constant cross-sectional area. In other embodiments of the present disclosure, annulus 22G may have a varying cross-sectional area to alter and control the fluid flow through the annulus. For example, the cross-sectional area of the annulus may be selectively reduced to, for example, "choke" the flow, that is, reduce the pressure and increase the velocity of the flow. FIG. 2D shows two different means of choking the annular flow. Buoyancy element 22A has inner radius 22C, which has a large radius, and which is oriented such that the annular cross-sectional area varies continuously between apertures 24A and 24B. Buoyancy element 22B has venturi 22D located at about a midpoint between apertures 24A and 24B. The features shown in FIG. 2D to control annular flow are by no means exhaustive, and other means to control annular flow will be apparent to those having ordinary skill in the art based on the teachings of this disclosure and a reasonable amount of experimentation. For example, flow restricting devices may be selectively installed in annulus 22G or even in apertures 24A and 24B to selectively "tune" the annular flow based on prevailing ocean current conditions. Grooves 23A and 23B and apertures 24A and 24B as shown in FIGS. 2A-2C are also depicted as having a substantially constant cross section, but other configurations are possible.

FIG. 2E shows four groove and aperture configurations according to embodiments of the present disclosure. Groove 26A and aperture 26B have substantially similar cross-sectional areas, and are similar to the grooves and apertures shown in FIGS. 2A through 2C, except that aperture 26B has radiused edges. Groove 27A tapers radially to aperture 27B such that the cross-sectional area of aperture 27B is smaller than the cross-sectional area of groove 27A. Groove 28A is relatively shallow (on the order of less than 50% of the thickness of the buoyancy elements), while aperture 28B has a much reduced cross-sectional area, radiused inner edges and substantially square outer edges. Groove 29A is also relatively shallow, but apertures 29B are discontinuous and not perpendicular to annulus 22G. In one embodiment, discontinuous apertures 29B are substantially tangential to annulus 22G. In another embodiment, discontinuous apertures 29B are substantially cylindrical holes. In yet another embodiment, discontinuous aperture 29B includes substantially circumferential slots molded into a helical separation plane at the base of aperture 29A in a "sawtooth" configuration.

In certain embodiments, the cross-sectional area of the substantially helical groove just inboard of the radius at the outside of the marine riser buoyancy module is larger than the cross-sectional area of the corresponding aperture between the substantially helical groove and the annulus. In this embodiment, the aperture may serve to control, or "choke" the flow from the substantially helical groove into the annulus, which may be used to balance the flows along the groove and through the annulus.

For any given set of subsea conditions, including but not limited to, current velocity, water temperature, and angle of inclination of the marine riser, there may exist an optimum configuration for the embodiments of the current disclosure to yield minimum drag and maximum VIV suppression, including but not limited to, the number and spacing of the helical grooves, helical angle (or pitch), groove width and depth, groove edge treatment (including especially the radius of curvature of the groove edges), aperture area and configuration, annular width and annular profile. These variables may be optimized by those having ordinary skill in the art by the use of Computational Fluid Dynamics (CFD) computer programs (such as the "FLUENT" suite of computer programs available from ANYSYS, Inc. of Canonsburg, Pa.) and/or by the use of water tank or wind tunnel testing of physical models.

Figure 3A:
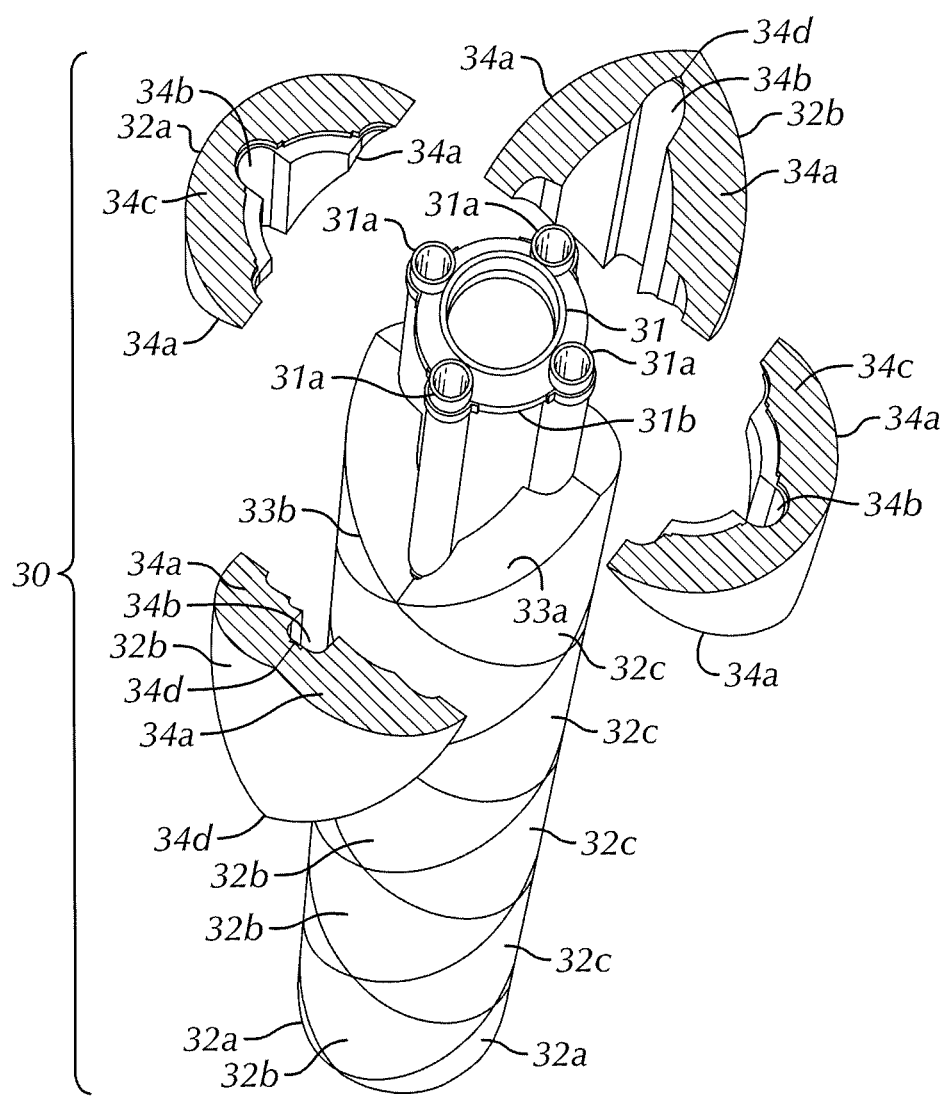
FIGS. 3A-3B show exploded perspective views of a marine riser with buoyancy elements in accordance with embodiments of the present disclosure.
Figure 3B:
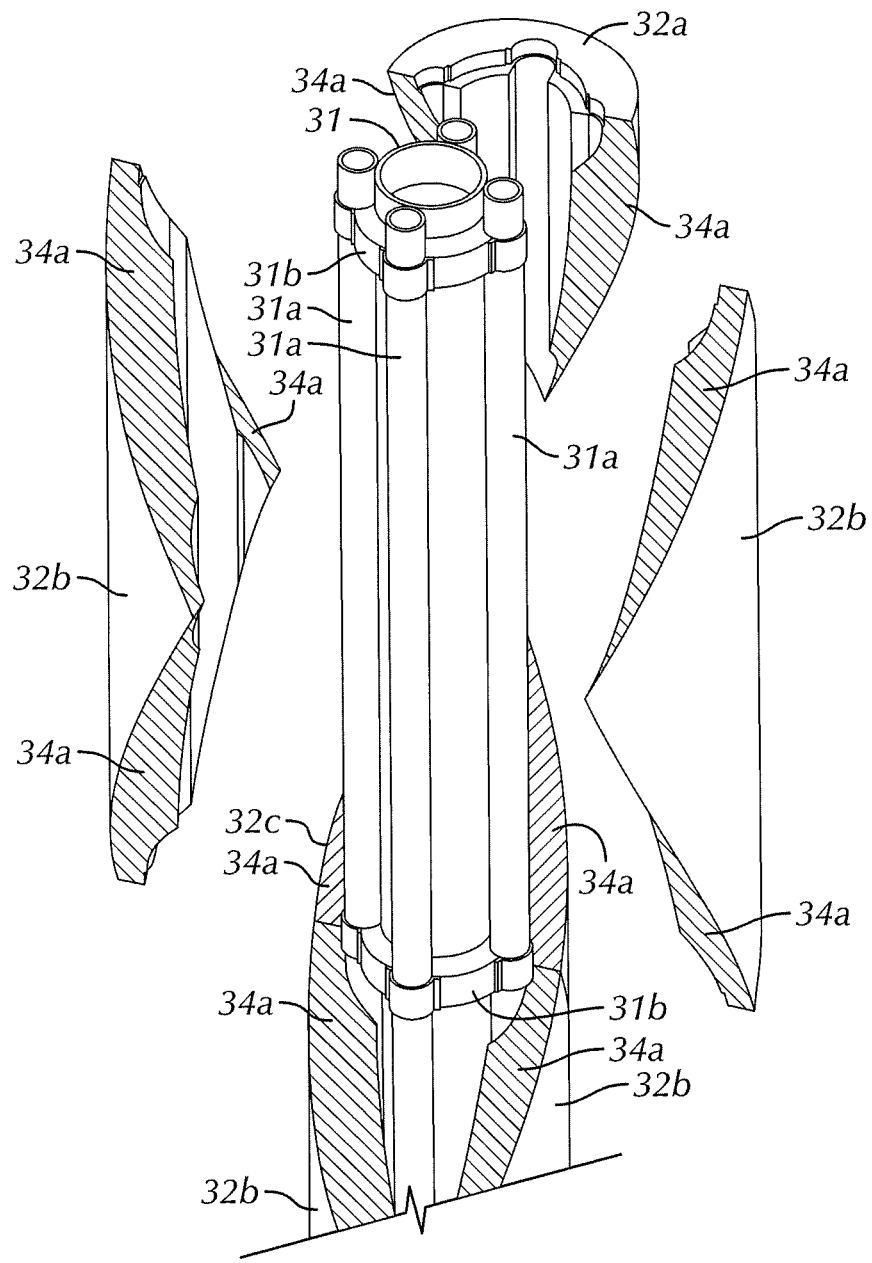
Figure 3C:
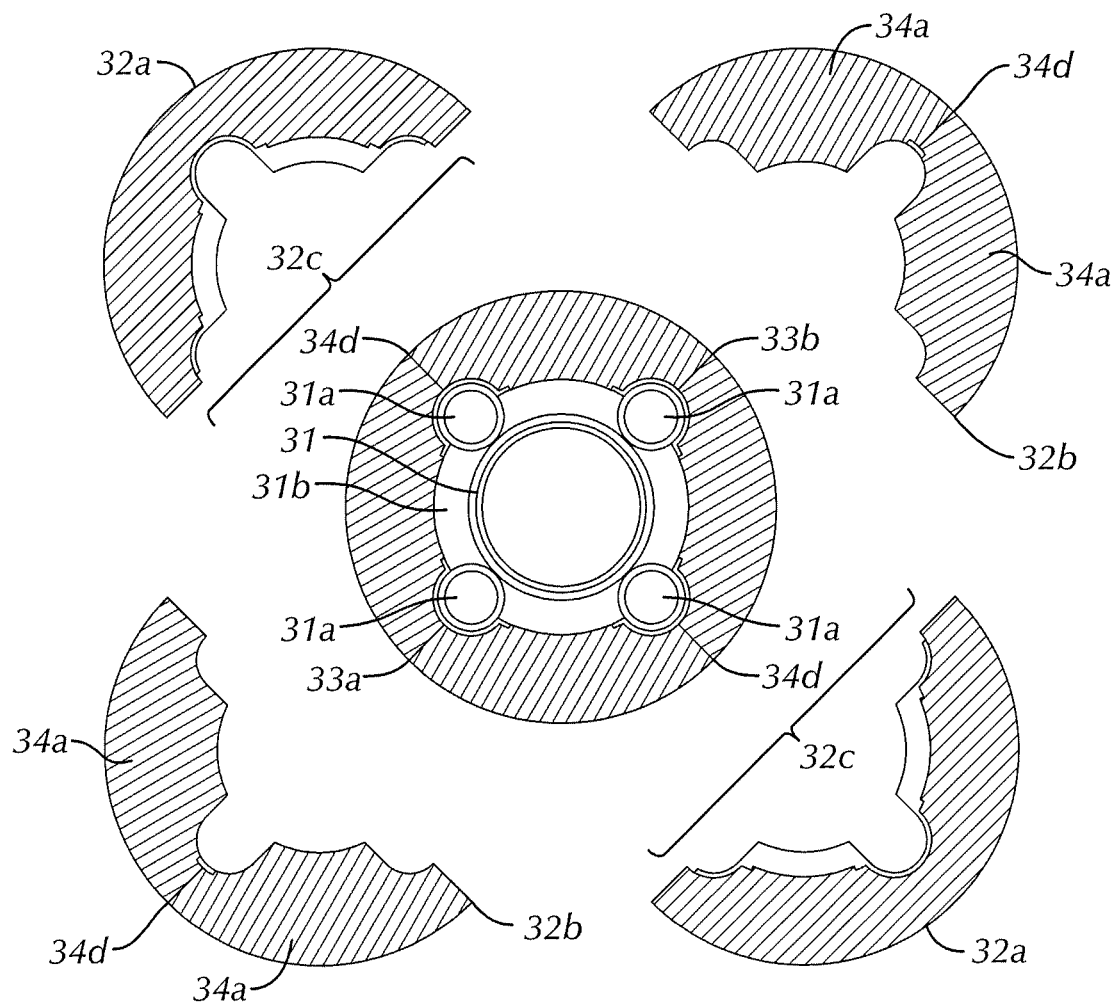
FIG. 3C shows an exploded cross-sectional view of a marine riser with buoyancy elements in accordance with embodiments of the present disclosure.

FIGS. 3A-3C show a marine drilling riser having generally arcuate "polygonal" buoyancy elements with intersecting helical separation planes, that is, in which the separation planes would describe simple polygons in a 2-dimensional ("unwrapped") representation of the buoyancy elements in accordance with embodiments of the present disclosure. FIGS. 3A-3C do not show grooves or apertures in or between the buoyancy elements nor any connections as for the main riser conduit of the auxiliary lines. Those having ordinary skill in the art will recognize that grooves and apertures may be added as required (as, for example, shown in later figures) and that buoyancy modules including buoyancy elements without grooves or apertures may alternatively be used, for example, to increase buoyancy: (a) between buoyancy modules comprising grooved elements; or (b) on a part of a riser string (for example, at or near the seabed) where current may be negligible and thus the need for reduced drag or VIV suppression is very small.

Referring now to FIG. 3A, an exploded view, marine drilling riser assembly 30 has main conduit 31 and auxiliary lines 31A (such as choke-and-kill lines, riser boost lines, or electric or hydraulic control lines) affixed to main conduit 31 with clamp 31B. Marine drilling riser assembly 30 also has triangular buoyancy elements 32A and parallelogram (or "diamond-shaped") buoyancy elements 32B and 32C which are separated by intersecting helical separation planes 33A and 33B (right-handed and left handed respectively), in a "diamond helix" or "DH" pattern. In certain embodiments, helical separation planes 33A and 33B will have the same helical angle, but of opposite sign, for example +/−24.4 degrees. Alternatively, helical separation planes may have the same pitch, but of opposite "hand", for example a pitch of 3 diameters, one right-handed, one left-handed. Buoyancy elements have helical parting surfaces 34A and auxiliary line grooves 34B.

In the embodiment shown in FIG. 3A, "triangular" buoyancy elements 32B are located only at the axially distal ends of the marine riser. In other similar embodiments, of course, triangular buoyancy modules may be used in other locations, for example to terminate a grooved buoyancy module used in combination with standard "clamshell" buoyancy modules.

Diamond-shaped buoyancy elements may be identical to one another, or may differ, for example, in the method by which they are attached to marine drilling riser assembly 30 or in the grooves and recesses for adaptation to marine drilling riser 30. For example, diamond-shaped buoyancy elements 32B may attach at its axial distal ends to clamps 31A, while diamond-shaped buoyancy element 32C may attach to clamp 31A at an inner circumferential groove in the middle of the buoyancy element. In certain embodiments, diamond-shaped buoyancy elements 32B are affixed to riser clamps 31A at their axial distal ends, diamond-shaped buoyancy elements 32C are affixed to riser clamps 31A at an inner circumferential groove in the middle of the buoyancy element, and diamond-shaped buoyancy elements 32B and 32C are affixed to one another with fishplates or similar attachment mechanisms.

The embodiment represented in FIG. 3A has "double diamond" or "180 degree" buoyancy elements, that is, each diamond-shaped buoyancy element wraps around about 180 degrees of the marine riser. Other embodiments may include for example "three diamond," "four diamond," or "eight diamond" buoyancy elements in which each diamond-shaped buoyancy element wraps around 120, 90 or 45 degrees of the marine riser respectively; however, the inventors of the current disclosure believe that a double diamond configuration may be preferred in terms of drag reduction, VIV suppression, overall cost, and ease of manufacture.

In certain embodiments of the present disclosure, a marine riser has at least one attached auxiliary line, and buoyancy elements in a double diamond configuration. In a related embodiment, a marine drilling riser has a plurality of attached auxiliary lines and buoyancy elements in a double diamond configuration in which the diamond-shaped buoyancy elements are between 10 and 15 feet long. In another embodiment, a marine drilling riser has a plurality of auxiliary lines and double-diamond buoyancy modules including two diamond-shaped buoyancy elements and four triangular buoyancy elements in a double diamond configuration. In a related embodiment, a marine drilling riser joint has a mixture of double diamond buoyancy modules and standard "clamshell" buoyancy modules.

Figure 3D:
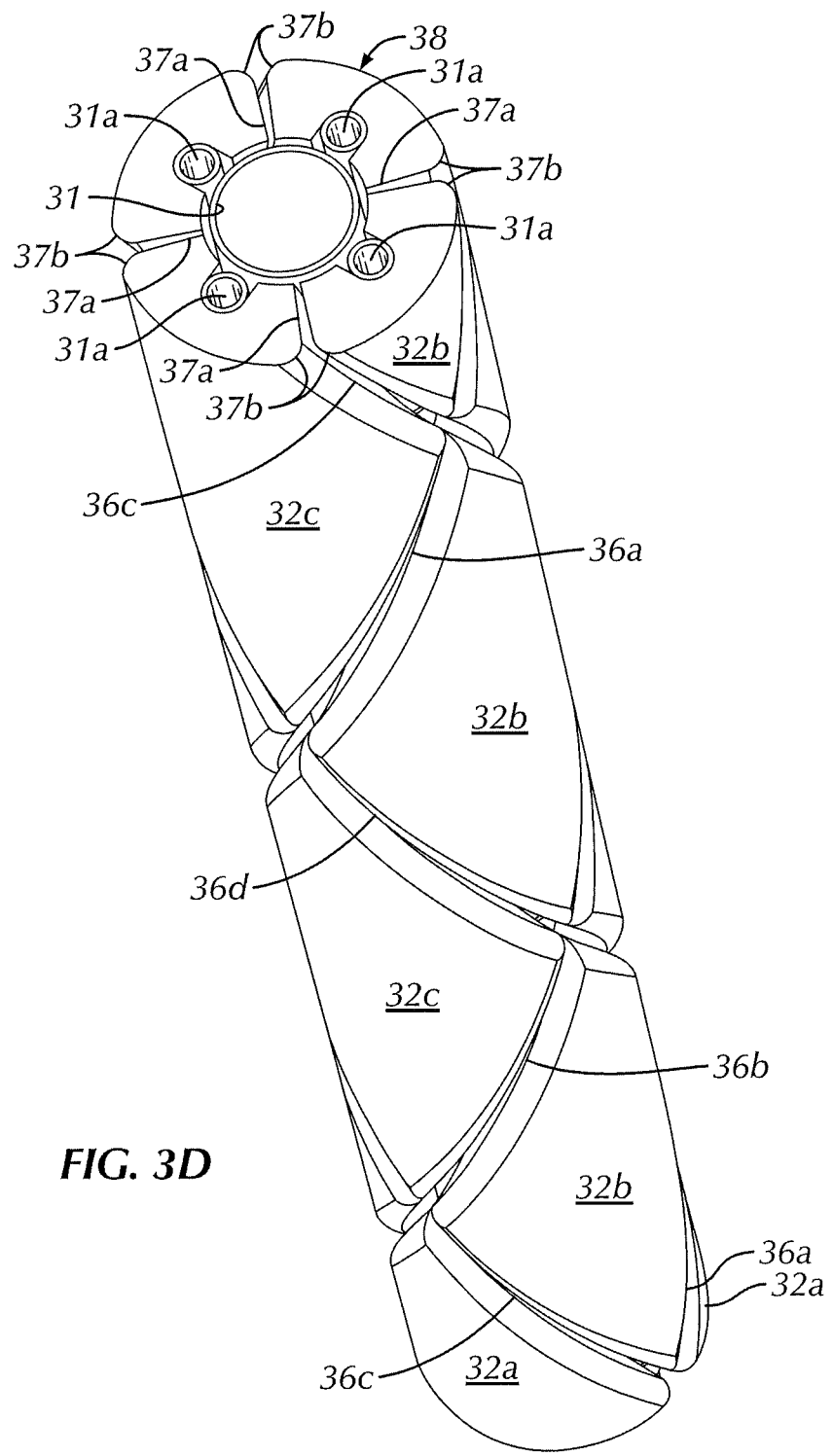
FIG. 3D shows a cross-sectional perspective view of a marine riser with buoyancy elements in accordance with embodiments of the present disclosure.

FIG. 3B is a different exploded view of the embodiment of the current disclosure shown in FIG. 3A, with one triangular buoyancy module 32A and one diamond-shaped buoyancy module 32C removed for clarity, especially to show the position of clamps 31B. FIG. 3C is a plan (or top) exploded view of the embodiment of the present disclosure shown in FIG. 3A. Clamp 31B is affixed to marine riser main conduit 31. Auxiliary lines 31A in turn are affixed to clamp 31B. Riser buoyancy elements include triangular buoyancy elements 32A, and diamond buoyancy elements 32B and 32C. Diamond-shaped buoyancy elements 32C are shown assembled on the marine riser, and have peaks 34D and separation planes 33A. Diamond-shaped buoyancy elements 32B are shown in exploded view, and have peaks 34D and helical parting surfaces 34A. FIG. 3D shows a horizontal sectioned view near the lower distal end of a marine riser with polygonal buoyancy elements, representing an embodiment of the current disclosure similar to that shown in FIGS. 3A-3C, except that there are grooves and apertures between the buoyancy elements in fluid communication with an annulus between the buoyancy elements and the marine riser main conduit.

In this embodiment, a marine riser has main conduit 31, auxiliary lines 31A, triangular buoyancy elements 32A, and diamond-shaped buoyancy elements 32B and 32C. Annulus 35 between main conduit 31 and buoyancy elements 32A, 32B, and 32C is in fluid communication with substantially helical grooves 36A and 36B (which have a right-handed pitch) and with substantially helical grooves 36C and 36D (which have left-handed pitch). Substantially helical grooves 36A, 36B, 36C and 36D have apertures 37A adjacent to annulus 35 and outer radii 37B. In the embodiment shown in FIG. 3D, the substantially helical grooves taper slightly towards apertures 37, but other configurations of the grooves and apertures are possible.

Further, in the embodiment shown in FIG. 3D, main conduit 35 has outer diameter of about 21¼ inches, annulus 35 is about 1 inch wide, substantially helical grooves 36A through 36D are on the order of 2 inches wide with radii 37B of about 3 inches on their edges, and the outer diameter 38 of the assembled buoyancy elements is about 48½ inches.

Referring now to FIGS. 4A-4D, two-dimensional "maps" of "unwrapped" buoyancy modules are shown in accordance with embodiments of the present disclosure. The maps of the buoyancy modules include polygonal buoyancy elements, representing embodiments of the current disclosure. FIGS. 4A-4D do not depict an annulus or apertures between substantially helical grooves and the annulus.

Figure 4A:
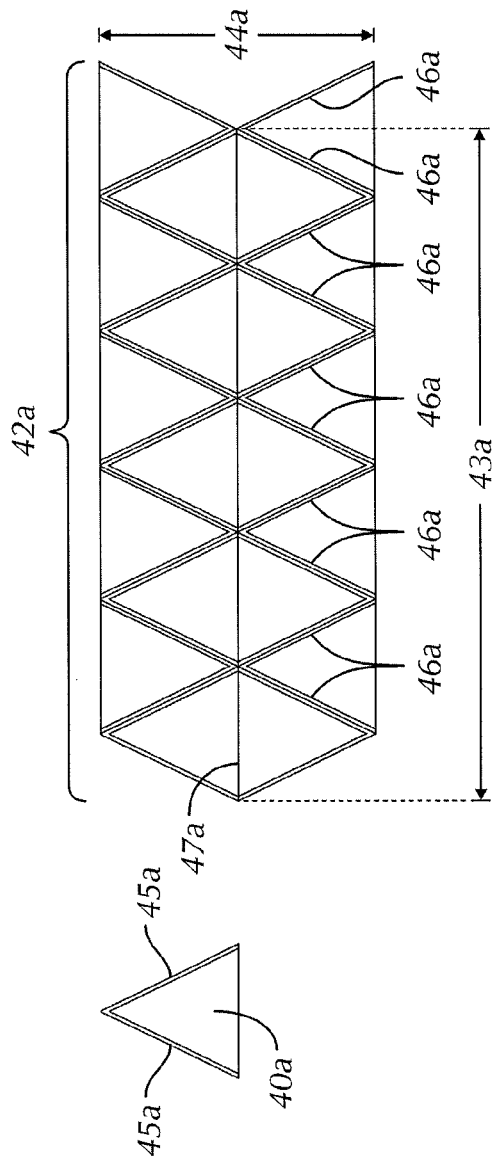
FIGS. 4A-4D show two-dimensional "maps" of "unwrapped" buoyancy modules in accordance with embodiments of the present disclosure.

FIG. 4A shows buoyancy module 42A including a plurality of triangular buoyancy element 40A, which has groove profiles 45A cut or molded into two sides. Buoyancy module 42A has outer circumference 43A, height 44A, circumferential parting line 47A, and ten intersecting helical grooves 46A. This embodiment is effectively a horizontally-split "five diamond" configuration.

Figure 4B:
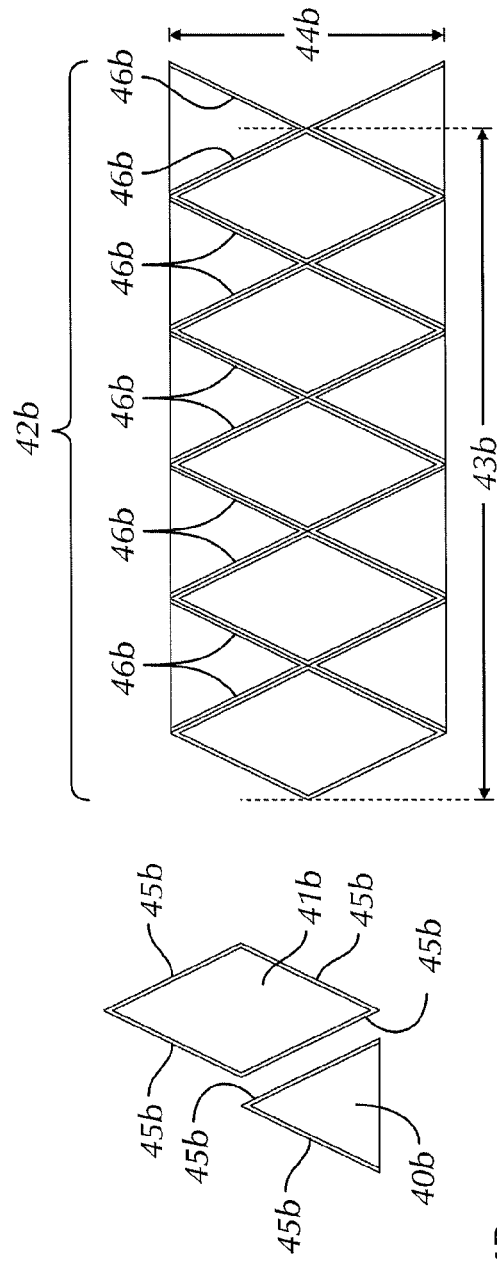

FIG. 4B shows buoyancy module 42B including a plurality of triangular buoyancy element 40B (with groove profile 45B on two sides) and diamond-shaped buoyancy element 41B (with groove profile 45B on four sides). Buoyancy module 42B has outer circumference 43B, height 44B, and ten intersecting helical grooves 46B. This embodiment is a "five diamond" configuration.

Figure 4C:
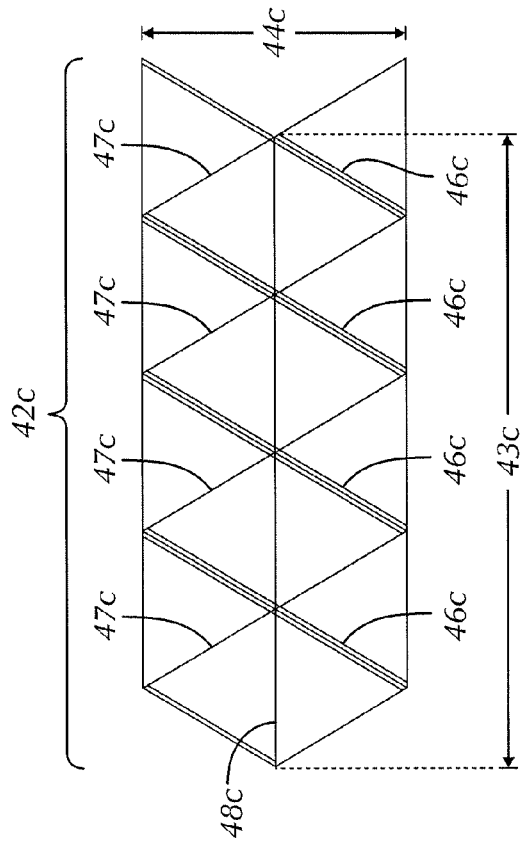
Figure 4C:
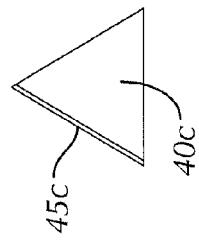

FIG. 4C shows buoyancy module 42C including a plurality of triangular buoyancy elements 40C with groove profile 45B in one side. Buoyancy module 42C has outer circumference 43C, height 44C, circumferential parting line 48C, helical separation plane 47C, and four substantially parallel helical grooves 46C. This embodiment is a "four helix" configuration.

Figure 4D:
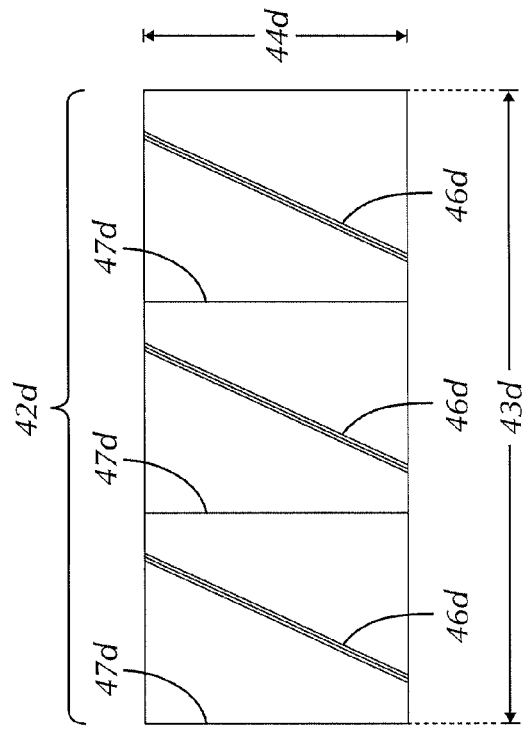
Figure 4D:
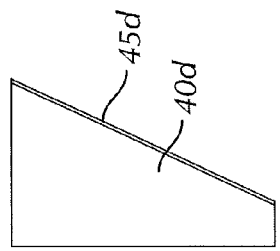

FIG. 4D shows buoyancy module 42D including a plurality of trapezoidal (that is, four sided, with one pair of parallel sides) buoyancy elements 40D with groove profile 45B on one side. Buoyancy module 42D has outer circumference 43D, height 44D, axial separation planes 47D and three substantially parallel helical grooves 46D. This embodiment is a "three helix" configuration.

In certain embodiments of the present disclosure, a method of manufacture may be provided in which a master mold is prepared for casting a full-size syntactic foam polygonal buoyancy elements (that is, with no gaps between the installed elements). Further, "groove inserts" and "aperture inserts" and "annulus inserts" are prepared for the mold which correspond to desired groove, aperture and annulus dimensions when the buoyancy element is installed. Finally, selected inserts are installed in the master mold corresponding to the desired groove, aperture and annulus dimensions for the buoyancy module, and the desired foam buoyancy element is cast. This method allows the dimensions of an individual buoyancy element to be tailored to the service requirements of the marine riser, such that a wide range of elements may be cast using one master mold.

For example, groove inserts may be used without aperture or annulus inserts to cast the buoyancy module shown in FIG. 2A. Alternatively, groove, aperture, and annulus inserts may be used to cast the buoyancy module shown in FIG. 2B. Further, dimension of the apertures or annulus may be varied to correspond to different requirements at different water depths. In another example, a triangular master mold may be used to build buoyancy modules with different helical patterns as shown, for example in FIGS. 4A and 4C.

Figure 5:
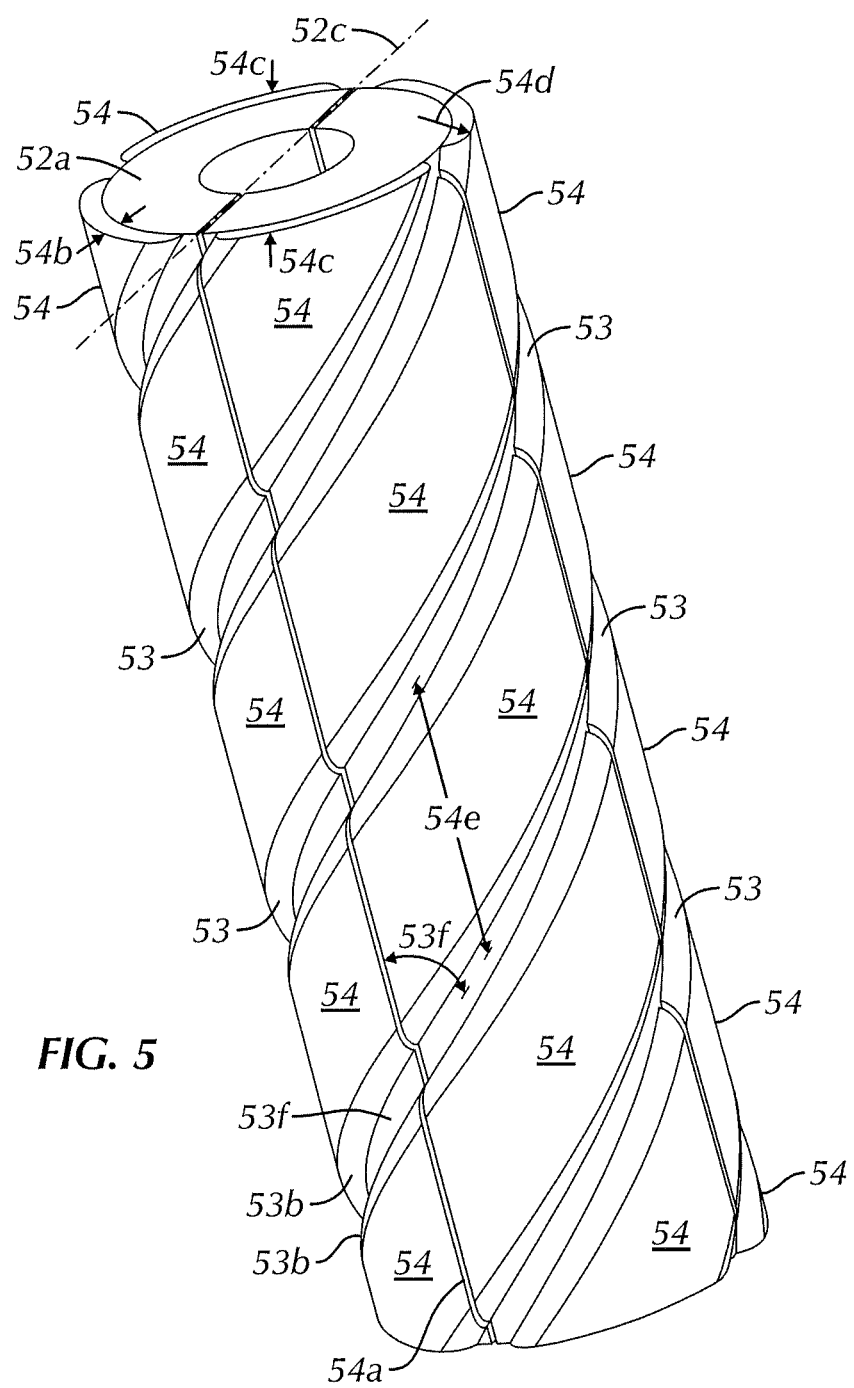
FIG. 5 shows a perspective view of buoyancy elements in accordance with embodiments of the present disclosure.

Referring now to FIG. 5, a perspective view of buoyancy elements in accordance with embodiments of the present disclosure is shown. Supplemental buoyancy pads may be fitted to existing riser buoyancy elements. CFD models suggest that the drag coefficient ($C_d$) after adding supplemental buoyancy pads about 3 inches thick may be about the same as for 48½ inch cylindrical buoyancy modules, but that the buoyancy lift force is higher and a transverse lift coefficient ($C_L$) may be about two orders of magnitude lower than without the buoyancy pads. Buoyancy elements 52A and 52B may be standard "clamshell" buoyancy elements known to those skilled in the art (central riser conduit and auxiliary lines (if any) are not shown in the interest of clarity). Buoyancy elements 52A and 52B may be joined together by conventional methods, for example, by threaded fasteners or otherwise, at a plane 52C to form a buoyancy module.

Supplemental buoyancy elements 54 have radiused edges 53B, substantially axial edges 54A, thickness 54B and outer diameter 54C. Supplemental buoyancy elements 54 may be affixed to buoyancy elements 52A and 52B in a pattern defined by four helical separation planes (not shown) between the supplemental buoyancy pads. This pattern may form four equally-spaced helical grooves 53, each groove having radiused edges 53B and groove root 53F (formed by the outer skin of the buoyancy module). Radiused edges 53B may have a fixed arcuate radius 54D measured in a plane normal to the axis of the riser, or alternately may have a fixed arcuate radius measured in a plane orthogonal to the helical separation plane, or may have a compound radius similar to a foil. In certain embodiments disclosed herein, radiused edges 53B may have a fixed arcuate radius 54D equal to or greater than thickness 54B. In further embodiments, the fixed arcuate radius may be between about 5% and 10% of the outer diameter 54C.

In the embodiment shown in FIG. 5, axial edges 54A of some supplemental buoyancy elements 54 may be arranged such that they are coincident with plane 52C in order that, for example, buoyancy elements 52A and 52B with attached supplemental buoyancy elements 54 may be conventionally removed as "clamshells". In certain embodiments, helical grooves 53 may be arranged such that they pass over the attachment hardware for buoyancy elements 52A and 52B. In other embodiments, supplemental buoyancy elements may be affixed to buoyancy elements 52A and 52B such that the supplemental buoyancy elements overlap plane 52C, which may tend to improve hydrodynamic characteristics at the expense of making removal of buoyancy elements 52A and 52B more difficult. Further, supplemental buoyancy elements may be configured in any of the shapes shown in FIGS. 4A-4D, or in other similar shapes.

In certain embodiments disclosed herein, supplemental buoyancy elements may be arranged to form two, three, or four grooves equally arrayed around the circumference of the clamshell buoyancy elements. In other embodiments, supplemental buoyancy element thickness 54B may be between about 5% and 10% of outer diameter 54C. In yet another embodiment of the present disclosure, outer diameter 54C may be between about 54 and 58 inches.

Further, in certain embodiments, gaps between mating axial edges 54A may be filled, as with syntactic foam, or epoxy or polyurethane resins. In other embodiments, the edges of groove root 53F may be filleted with a thickened epoxy resin to insure good fluid flow along the substantially helical groove. In still further embodiments, supplemental buoyancy elements 44 coincident with plane 52C may be arranged such that the gap between mating supplemental buoyancy elements 44 may be smaller than the corresponding gap between buoyancy elements 52A and 52B, thus improving the hydrodynamic properties of the buoyancy module. In certain embodiments, some supplemental buoyancy elements 54 may encompass a full 180 degrees such that the axial edges 54A of each buoyancy pad are coincident with plane 52C.

In methods related to embodiments disclosed herein, supplemental buoyancy elements may be molded from syntactic foam, affixed to buoyancy modules to form a pattern of helical grooves defined by helical separation planes, and the resulting grooves may be coated with a hydrophobic coating. In related embodiments, the hydrophobic coating may be a thixotropic resin. In still other related embodiments, fillets may be formed at the edges of the groove root using the hydroscopic coating.

In a method of manufacture of the embodiment of the present disclosure shown in FIG. 5, buoyancy elements 52A and 52B may have a pattern of blind radial holes drilled into their outer diameter, and pultruded fiberglass dowels may be glued into the blind radial holes to anchor over-molded supplemental buoyancy elements. Further, supplemental buoyancy elements may be overmolded onto buoyancy elements 52A and 52B. In other methods of manufacture of embodiment shown in FIG. 5, supplemental buoyancy elements may be molded, for example with syntactic foam using methods known in the art and the molded supplemental buoyancy elements may be affixed to the outer diameter of a buoyancy element with an adhesive and threaded fasteners.

In still further methods of manufacture of the embodiment shown in FIG. 5, supplemental buoyancy elements may be molded, for example with syntactic foam using methods known in the art. The molded supplemental buoyancy elements may be affixed to the outer diameter of a buoyancy element with, for example, an adhesive, and blind radial holes may be drilled through the supplemental buoyancy element into the underlying buoyancy module, and a pultruded fiberglass dowel may be driven into the blind hole and affixed in place with an adhesive. Those having ordinary skill in the art will recognize that this method may be advantageously used in situ on a mobile offshore drilling rig, obviating the need to remove buoyancy elements from a marine riser and bring them ashore to a molding facility.

Axial groove spacing 54E is the axial distance between the center of neighboring grooves, and for equally spaced grooves will be a function of helical angle 54F and the number of grooves. Generally, axial groove spacing may equal the length of one pitch (as calculated earlier) divided by the number of grooves. For example, in the example shown in FIG. 5, there are four helical grooves with helical angle of 46.3 degrees on supplemental buoyancy pads with an outer diameter ("D") of 54½ inches. One pitch is 163.5 inches, and the axial separation is therefore about 40⅞ inches, or about 0.75 D. In one embodiment of the present disclosure, a buoyancy element or buoyancy elements with supplemental buoyancy elements may have a plurality of helical grooves with an axial separation between 0.5 and 2.0 diameters. In other embodiments, helical grooves may have an axial separation between 0.7 and 1.8 diameters. In a related embodiment of the present disclosure, helical grooves may have an axial separation between 0.8 and 1.6 diameters. In further related embodiments of the present disclosure, the helical grooves may have an axial separation between 0.8 and 1.2 diameters.

Advantageously, embodiments of the present disclosure provide buoyancy modules for marine risers that are easily adaptable to current marine riser designs, use existing buoyancy materials, and may significantly reduce drag and suppress VIV with a very small loss in net buoyancy from standard buoyancy modules. Significantly, the embodiments disclosed herein are more economical of cost and riser running time than effective VIV suppression techniques of the prior art, especially including foil-shaped fairings or other appurtenances to the riser.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A marine riser comprising:
a substantially cylindrical buoyancy module surrounding the marine riser, the buoyancy module comprising at least two buoyancy elements;
a first helical groove extending about an entire length and an outer periphery of the buoyancy module; and
a second helical groove extending about the entire length and the outer periphery of the buoyancy module
wherein the at least two buoyancy elements are spaced apart by the first helical groove and the second helical groove, and
wherein one of the first helical groove and the second helical groove have a right handed pitch and the other of the first helical groove and the second helical groove have a left handed pitch.

2. The marine riser of claim 1, further comprising:
a plurality of buoyancy modules wherein each of the plurality of buoyancy modules is positioned along the marine riser at a unique depth location.

3. The marine riser of claim 1, wherein the at least two buoyancy elements are separated from each other at at least one separation interface.

4. The marine riser of claim 3, further comprising:
a hydrophobic coating disposed adjacent to the at least one separation interface.

5. The marine riser of claim 3, wherein the first helical groove and the second helical groove are disposed along the at least one separation interface.

6. The marine riser of claim 5, wherein the at least two buoyancy elements are separated longitudinally along the at least one separation interface further comprising:
a hydrophobic coating disposed along the first helical groove and the second helical groove.

7. The marine riser of claim 3, further comprising:
at least one stripe of hydrophobic coating disposed along a surface of at least one of the at least two buoyancy elements.

8. The marine riser of claim 7, wherein the stripe is substantially helical.

9. The marine riser of claim 3, further comprising:
at least one stripe of hydrophobic coating disposed along a surface of at least one of the plurality of buoyancy modules.

10. The marine riser of claim 9, wherein the stripe is substantially helical.

11. The marine riser of claim 9, further comprising:
wherein the at least two buoyancy elements comprise a cylindrical outer profile when disposed adjacent to each other along the at least one helical separation interface.

12. The marine riser of claim 3, wherein the at least two buoyancy elements are separated longitudinally along at least one axial separation interface.

13. The marine riser of claim 3, wherein the at least one separation interface comprises a helical separation interface.

14. The marine riser of claim 13, wherein the at least two buoyancy elements are separated longitudinally along the at least one helical separation interface.

15. The marine riser of claim 3, further comprising:
an annulus between the buoyancy module and a main conduit of the marine riser; and
at least one aperture between at least one groove and the annulus, such that there is fluid communication between the at least one groove and the annulus.

16. The marine riser of claim 15, wherein the annulus comprises a non-constant cross-sectional area.

17. The marine riser of claim 1, wherein the first helical groove and the second helical groove have the same helical angle.

18. A marine riser comprising:
a substantially cylindrical buoyancy module comprising a plurality of buoyancy elements separated from one another; and
at least two helical grooves in an outer surface of the substantially cylindrical buoyancy module,
wherein at least one of the at least two helical grooves has a right handed pitch and at least one of the at least two grooves has a left handed pitch.

19. The marine riser of claim 18, wherein a pitch of the at least two helical grooves is defined in terms of an outer diameter of the buoyancy module.

20. The marine riser of claim 18, wherein an angle of the at least two helical grooves is defined in terms of an outer diameter of the buoyancy module.

21. The marine riser of claim 18, wherein a depth of the at least two helical grooves is defined in terms of an outer diameter of the buoyancy module.

22. The marine riser of claim 18, further comprising:
an axial separation between the plurality of buoyancy elements disposed within the at least two helical grooves.

23. The marine riser of claim 22, wherein the axial separation is between about 0.5 D and 2.0 D.

24. The marine riser of claim 22, wherein the axial separation is between about 0.7 D and 1.8 D.

25. The marine riser of claim 22, wherein the axial separation is between about 0.8 D and 1.6 D.

26. The marine riser of claim 18, wherein the at least two grooves have the same helical angle.

* * * * *